United States Patent [11] 3,616,113

| [72] | Inventor | John M. Sawyer |
| | | Cuyahoga Falls, Ohio |
| [21] | Appl. No. | 834,021 |
| [22] | Filed | June 17, 1969 |
| [45] | Patented | Oct. 26, 1971 |
| [73] | Assignee | The Goodyear Tire & Rubber Company |
| | | Akron, Ohio |

[54] POLYURETHANE LAMINATE AND METHOD OF FORMING SAID LAMINATE
6 Claims, 6 Drawing Figs.

[52] U.S. Cl. .................................................. 161/39,
52/273, 52/514, 161/40, 161/69, 161/117,
161/146, 161/160, 161/161, 161/190
[51] Int. Cl. ...................................................... B32b 1/06,
B32b 3/26, B32b 27/40
[50] Field of Search............................................ 161/190,
100, 108, 146, 147, 148, 40, 69, 117, 160, 161;
156/304, 94; 52/273, 514

[56] References Cited
UNITED STATES PATENTS

| 2,300,084 | 10/1942 | Wright ......................... | 52/273 |
| 2,974,078 | 3/1961 | Petritz et al. .................. | 161/190 X |
| 3,091,551 | 5/1963 | Robertson ..................... | 161/190 X |
| 3,475,383 | 10/1969 | Stewart ........................ | 161/190 X |
| 3,510,439 | 5/1970 | Kaltenbach et al. .......... | 161/190 X |

Primary Examiner—John T. Goolkasian
Assistant Examiner—C. B. Cosby
Attorneys—F. W. Brunner and Ronald P. Yaist ABSTRACT: A laminate of at least two layers including at least one flexible coating layer composed of a polyurethane composition for sealing separations in substrate layers, such as structural members, and the method of forming these laminates. The flexible coating layer covers adjacent surfaces of the substrate layer and the separation and is adhered to the substrate layer except in areas immediately adjacent to and directly over each separation, thus forming at least one nonadhering portion of the coating layer so that when the substrate layer moves due to thermal or mechanical forces substantially all of any stress associated with such movement is distributed over each nonadhering portion to prevent a concentration of stresses which would rupture the coating layer. The laminates of this invention are particularly useful for sealing separation in the bulkhead compartment of ships, and the flexible coatings of such laminates are composed of polyurethane compositions having resistance to fuels and water hydrolysis.

PATENTED OCT 26 1971 3,616,113

INVENTOR.
JOHN M. SAWYER

BY
*R P Yaist*
ATTORNEY

INVENTOR.
JOHN M. SAWYER
BY
R. P. Yaist
ATTORNEY

POLYURETHANE LAMINATE AND METHOD OF FORMING SAID LAMINATE

THE INVENTION

This invention relates to laminates including flexible coatings of a polyurethane composition for sealing separations in substrates, such as structural members, and to methods of forming these laminates. More specifically, this invention relates to such laminates for sealing bulkhead compartments in oceangoing vessels in which a polyurethane composition is provided having resistance to liquids, such as fuels and salt water, and particularly a polyurethane composition, such as a polyesterurethane which is resistant to water hydrolysis when immersed in distilled water for 14 days at 158° F.

Flexible coatings of polyurethane compositions are applied to cover and protect substrates composed of structural members, such as steel, concrete, and the like, against rust, corrosion, and excessive wear. These members, for example, customarily form surfaces, such as roofs and sidewalks, or receptacles, such as storage tanks and bulkhead compartments of ships and other similar structures.

Often, openings or separations in the form of cracks, joints, and seams are present or eventually develop in these members either before or after the coating is applied. Obviously, it is necessary to seal these separations to prevent deterioration of the members. In addition, the movement of these members, due to thermal or mechanical expansion and contraction, may cause a rupture of the polyurethane coating by concentrating the resulting stresses in a relatively small portion of the coating.

For example, the bulkhead compartments of oceangoing vessels, such as oil tankers, are normally constructed of bolted or welded metal panels. In such vessels, especially those of World War II vintage, or earlier, due to the sometimes violent movement in heavy seas, hairline cracks or separations often occur in the bulkhead compartments where various fuels are stored. These cracks most frequently develop at the welds or juncture of the horizontal and vertical metal panel members which form the compartments, causing leakage of the fuels contained in one compartment into the adjacent compartment. This, of course, may result in contamination of these various fuels, especially during periods of high stress when the cracks widen temporarily. Moreover, a high hydrostatic pressure is created when one compartment is emptied which causes severe leakage into the adjacent compartment having a lower hydrostatic pressure.

It is, therefore, extremely necessary and desirable to provide an adequate seal in locations of the bulkhead compartments where cracks are likely to develop. If a proper seal is not formed, subsequent movement of the metal panel members will cause a localized stress resulting in the rupture of the flexible coating on the surfaces of the metal panel members which form the bulkhead compartment.

Moreover, the polyurethane coating material must not only be resistant to fuels, such as crude oil, gasoline, and kerosene, which are contained in the bulkhead compartments, but must also be resistant to water hydrolysis since a high-pressure salt water spray reaching temperatures of up to 180° F. is employed to clean these compartments after use.

It is, therefore, a primary object of this invention to provide a laminate including a flexible coating composed of a polyurethane composition for sealing separations in substrates, such as structural members, with the laminate of sufficient strength and flexibility so that when the members move due to thermal or mechanical forces the coating will not be ruptured thereby.

It is another primary object of this invention to provide such a laminate for sealing bulkhead compartments in oceangoing vessels in which a polyurethane composition is provided having resistance to fuels and water hydrolysis.

In accordance with the present invention, it has been found that the desired sealing structure is provided by a laminate having at least two layers including a substrate layer composed of at least one member having at least two adjacent separated surfaces with a separation therebetween to be sealed, and at least one flexible coating layer composed of a polyurethane composition substantially covering the adjacent surfaces of the substrate layer and the separation therebetween. The coating is adhered to the adjacent surfaces of the substrate except in areas immediately adjacent to and directly over each separation In this way the separation or opening is bridged and a nonadhering portion of the coating layer is formed. Consequently, the laminate is of sufficient strength and flexibility so that when the substrate layer of the laminate moves due to thermal or mechanical forces, substantially all of any stress associated with such movement is distributed over the nonadhering portion of the coating layer to prevent a concentration of stresses corresponding to the dimensions of the separation which would rupture the coating layer.

Preferably, one or more fillers is positioned over the separation and covered by at least one coating layer to add to the bridging effect. Although almost any flexible material can be used for this purpose, it has been found that material selected from the group consisting of natural or synthetic elastomers, natural and synthetic foam rubbers, caulking compounds and textile fabrics are particularly suitable. The fillers should be at least substantially nonadhered to the coating which covers it; that is to say nonadhered or at least not tightly adhered thereto. Therefore, when movement occurs in the members of the substrate layer, the stresses associated with such movement are largely confined to the filler and not transferred to the coating layer to result in the rupture thereof. If the filler is tightly adhered to the coating layer which covers it, it should be of a relatively low-strength flexible material, such as natural or synthetic foam rubbers, caulking compounds, and textile fabrics, which have a lower tensile strength than that of the polyurethane coating composition. Accordingly, the filler when subjected to stress will break away from or separate from the coating layer rather than remaining adhered to the coating and transferring the stresses thereto.

Alternately, in most situations, it is desirable to first apply at least one additional flexible coating layer composed of a polyurethane composition to cover the substrate in the areas immediately adjacent to the separation and then to position the filler over the separation and overcoat the filler and adjacent surfaces of the substrate layer with at least one coating layer of a polyurethane composition. In this way, further protection is added in the area of separation.

The method of forming the laminates of this invention generally includes, (a) preparing the surfaces of the substrate layer adjacent to the separation for the application of the coating layer, (b) applying at least one flexible coating layer composed of a polyurethane composition to substantially cover the adjacent surfaces of the substrate layer, and (c) adhering the coating layer to the adjacent surfaces of the substrate layer except in areas immediately adjacent to and directly over each separation therein, thus forming at least one nonadhering portion of the coating layer so that when the substrate layer moves substantially all of any stress associated with such movement is distributed over each nonadhering portion of the coating layer to prevent a concentration of stresses which would rupture the coating layer.

The objects and advantages of the invention may be more readily understood by reference to the drawings in which.

Figure 1:
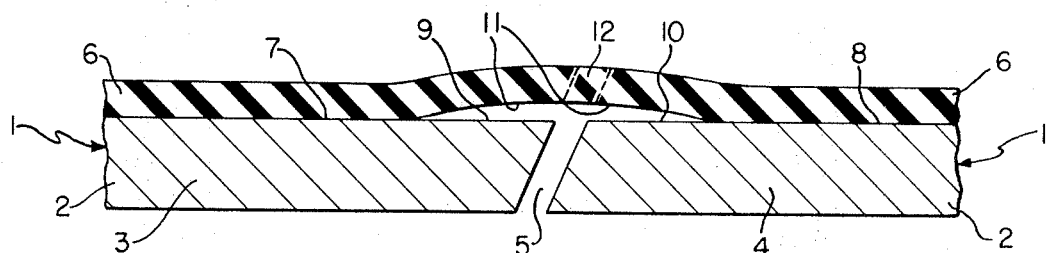
FIGS. 1 and 2 are sectional views showing typical forms of the laminates of this invention.
Figure 2:
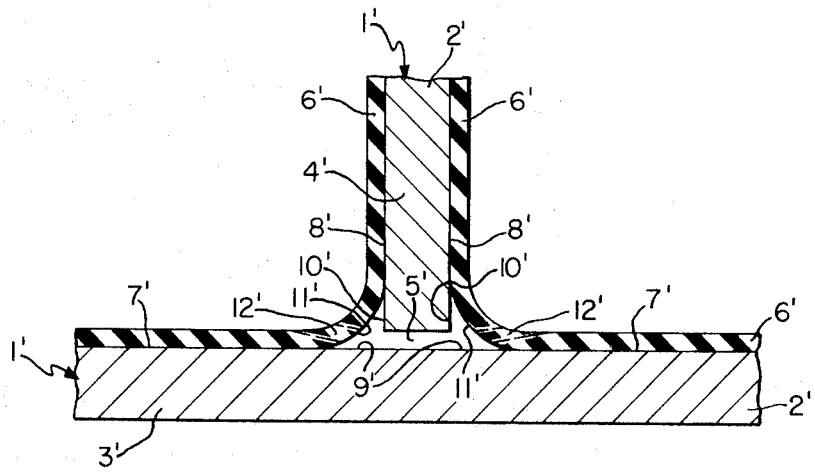

In FIGS. 1 and 2, respectively, a laminate 1 and 1' is shown including a substrate layer 2 and 2' composed of metal members 3 and 4 and 3' and 4' having an opening or separation 5 and 5' therebetween, such as, for instance, a joint or seam in structural steel plates. In FIG. 1, the members 3 and 4 are shown in an end-to-end relationship with the separation 5 therebetween, while in FIG. 2, the members 3' and 4' are shown perpendicular to each other with the separation 5' shown at the juncture thereof. Of course, the members 3' and 4' may also be inclined to each other at various angles other than right angles. A flexible coating layer 6 and 6' of a polyurethane composition is provided substantially covering adjacent surfaces 7 and 8 and 7' and 8' of the members 3 and 4 and 3' and 4' of the substrate layer 2 and 2' respectively and is adhered or bonded thereto except in areas 9 and 10 and 9' and 10' respectively immediately adjacent to and directly over the separation 5 and 5'. A nonadhering portion 11 and 11' of the coating layer 6 and 6' is thus formed. When the substrate layer 2 and 2' moves due to thermal or mechanical forces, substantially all of any stress associated with such movement is distributed over the nonadhering portion 11 and 11' of the coating layer 6 and 6'. This prevents a concentration of stresses in an area 12 and 12', shown in broken lines, corresponding to the dimension of the separation 5 and 5' which would result in the rupture of the coating layer 6 and 6'. It is to be understood that the laminate necessary includes suitable adhesives, such as a metal primer to effect the adhesion or bond between the coating layer 6 and 6' and the substrate layer 2 and 2', respectively.

The nonadhesion may be accomplished by various means, for example, by positioning a nonadhering element or filler to substantially cover the areas adjacent to and directly over the separations prior to the application of the coating layer which is thereafter removed upon the hardening or curing of the coating layer.

Figure 3:
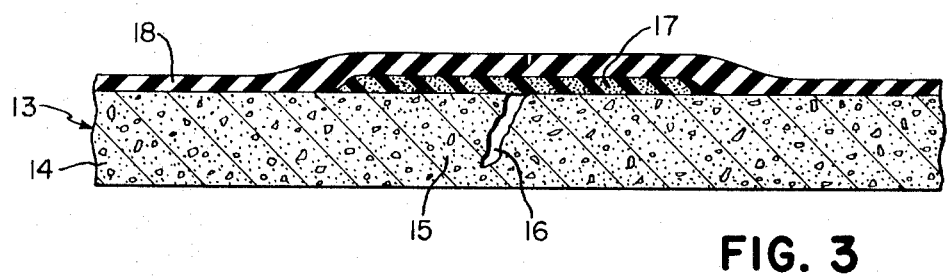
FIGS. 3 and 4 are sectional views showing modifications of the laminates shown in FIGS. 1 and 2.

However, in most instances, it is preferable to provide the fillers as permanent elements of the laminated structure. This is illustrated in FIG. 3 which shows an embodiment of the invention similar to that shown in FIG. 1 except that the laminate 13 includes a rigid substrate 14 in the form of a concrete member 15 having a separation 16 in the form of a break or crack therein. The concrete member 15 may, for instance, be a roof or sidewalk structure. In this application, a filler 17 of flexible material, such as an elongated strip of silicone rubber or caulk, is positioned over the separation 16 and covered by a flexible polyurethane coating 18. Filler 17 acts to bridge the separation 16 and is preferably at least substantially nonadhered to the coating layer 18 so that the stress caused by any movement in the concrete member 15 is largely confined to the filler 17 and not transferred to the coating layer 18 to result in the rupture thereof. Preferably, the at least substantial nonadherence is achieved by choosing a material which will not form a chemical bond with the polyurethane composition of the layer 18. Silicone and butyl elastomers or caulks are particularly suitable in this regard. The filler 17 may also be composed of other flexible materials, such as natural or synthetic foam rubbers, caulking compounds, and textile fabrics. These latter-mentioned materials which are of relatively low tensile strength or of poor adhesion to the polyurethane may be used for example, if it is desired to bond the filler 17 to the coating layer 18.

Figure 4:
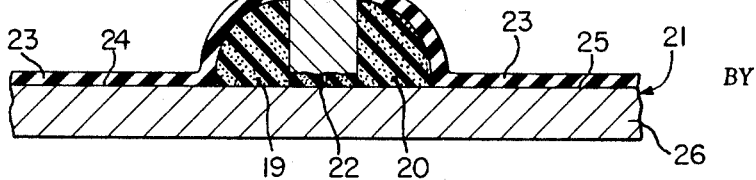

In FIG. 4, the employment of filler strips 19 and 20 in the laminated structure 21 similar to that of FIG. 2 is shown. In this embodiment, fillers 19 and 20 are positioned adjacent the separation 22 on either side thereof and are preferably composed of a soft pliable relatively flowable material, such as a caulking compound, which fills the separation 22. The fillers 19 and 20 and the adjacent surfaces 24 and 25 of the substrate layer 26 are covered by the coating layer 23.

Figure 5:
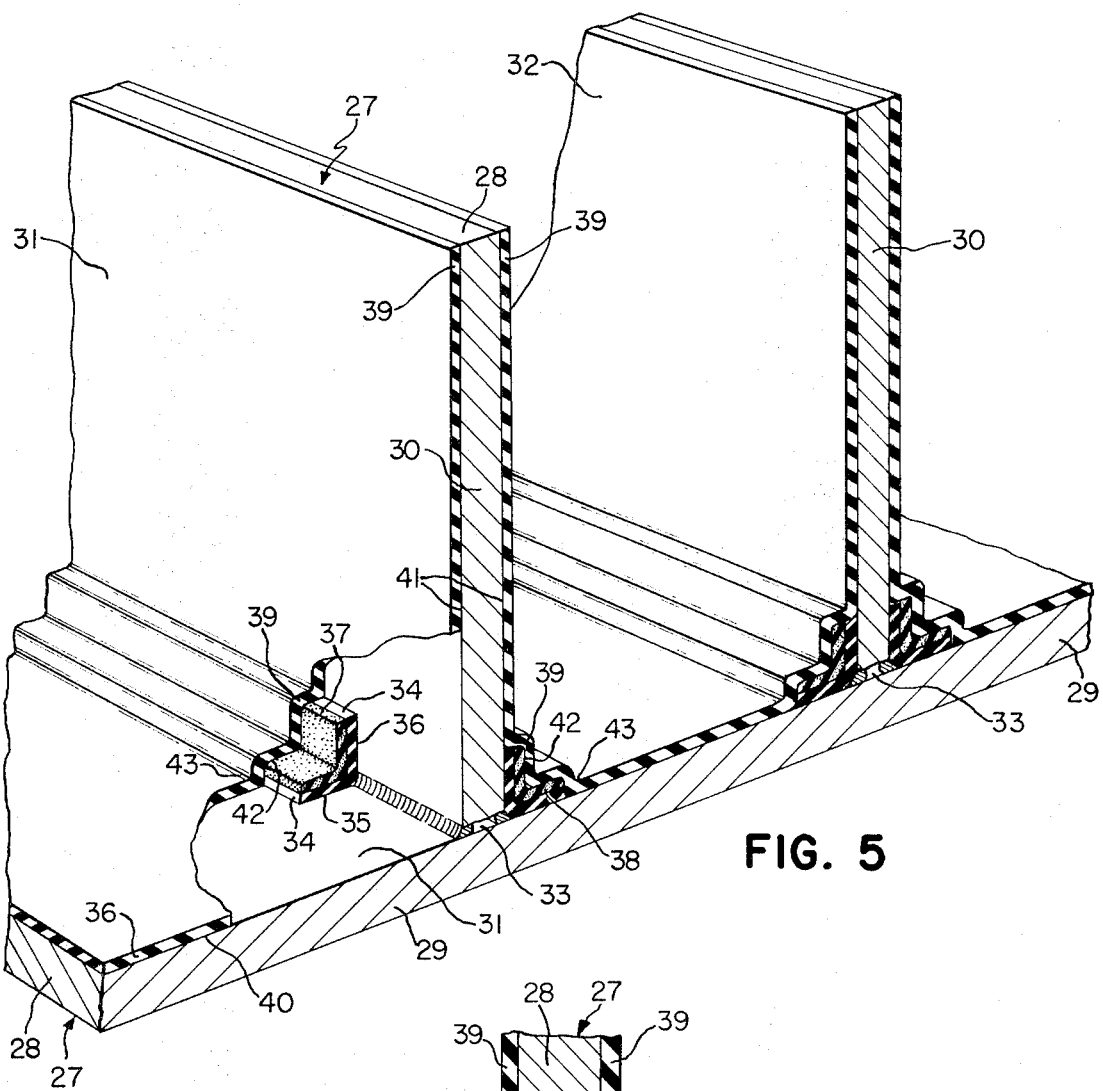
FIG. 5 is a perspective view of a typical application for the laminate of this invention.

In FIG. 5, a specific application of the sealing structure of this invention is shown in which the laminate 27 is used in the bulkhead of a vessel. The substrate layer 28 is composed of horizontal and vertical metal panel members 29 and 30, respectively, which form liquid-containing compartments 31 and 32. Over the period of many years, cracks or breaks 33 form in the weld or juncture of the members 29 and 30 due to movement of the vessel, especially in heavy seas. The cracks 33 preferably are welded shut prior to the forming of the laminate 27.

Figure 6:
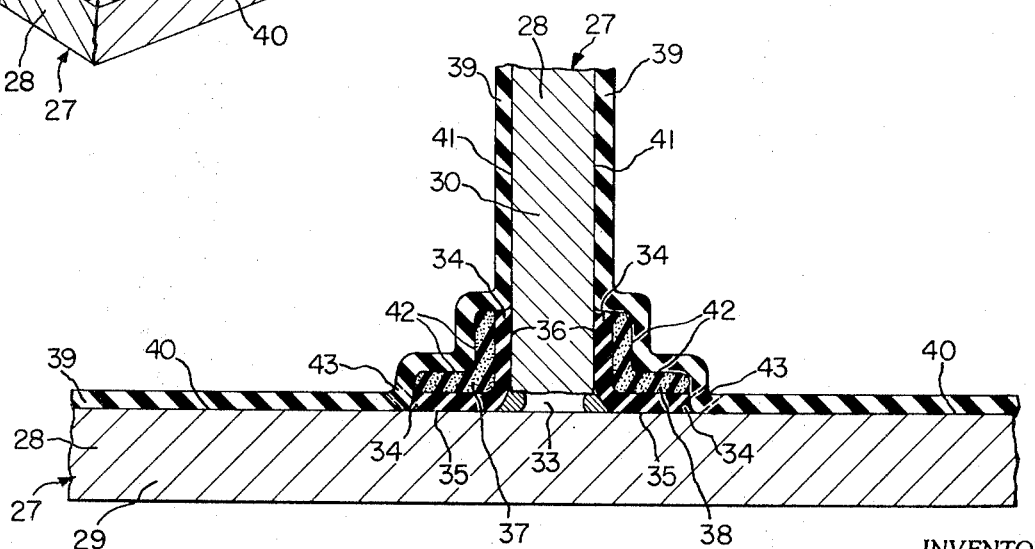
FIG. 6 is an enlarged sectional view more clearly illustrating the invention shown in FIG. 5.

As is most clearly shown in FIG. 6, preferably a coating 34 composed of a polyurethane material is applied in the areas 35 and 36 of the substrate layer 28 immediately adjacent to and on either side of the crack 33. Fillers 37 and 38 of flexible material, such as elongated strips of foam rubber, are superposed over at least a portion of the coating layer 34 to provide adequate bridging over the crack 33 and, in addition, to provide an area of nonadhesion for the polyurethane coating layer 39 which is superposed over the fillers 37 and 38 on either side of the crack 33. The foam rubber fillers 37 and 38 may also, if desired, include a pressure-sensitive adhesive layer to provide adhesion between the fillers 37 and 38 and the layer 34. Also, a material, such as masking tape may be used to hold the fillers 37 and 38 in place. Alternately, if the fillers 37 and 38 are formed of a relatively flowable caulking compound, as shown in FIG. 4, in place of the foam rubber, it is not necessary to use masking tape to hold the fillers in place. In addition, the caulking compound may be a more satisfactory filler from a cost standpoint.

The coating layer 39 substantially covers and is adhered to adjacent surfaces 40 and 41 of the members 29 and 30, respectively, of the substrate layer 28 except in areas 35 and 36 immediately adjacent to and directly over the cracks 33. A nonadhering portion 42 of the coating layer 39 is thus formed. Accordingly, when the members 29 and 30 move relative to each other due to the movement of the vessel, substantially all of any stress associated with such movement is distributed over the nonadhering portion 42 of the coating 39 rather than being concentrated in an area 43 (shown in broken lines) of the coating 39 corresponding to the dimension of the crack 33 which would likely result in the rupture of the coating layer 39.

It should be apparent to those skilled in the art that the double coatings of the laminate 27 provided by layers 34 and 39 are most desirable to insure a proper seal over the crack 33. In this arrangement, the fillers 37 and 38 provide a positive means of preventing the adhesion between the outer coating layer 39 and the inner coating layer 34 which covers and fills the crack 33. Consequently, after a break occurs in the coating layer 34 due to the relative movement between members 29 and 30, the coating layer 39 will remain intact to provide an adequate seal and prevent the leakage of the various fuels or other liquids contained in the bulkhead compartments 31 and 32. Furthermore, the fillers 37 and 38 are composed of foam rubber or caulking compound which is preferably substantially nonadhered to the coating layer 39, either chemically or physically, to insure that the stress caused by any movement of the panel members 29 and 30 will be largely confined to the fillers 37 and 38 and not transferred to the coating layer 39. If, however, some substantial adhesion does take place, as previously mentioned, the tensile strength of the foam material being less than that of the polyurethane coating layer 39, permits the breaking away of the fillers 37 and 38 from the coating without the rupture of the layer 39.

In the preferred method of forming the laminate shown in FIGS. 5 and 6, first the adjacent surfaces 40 and 41 of the metal panel member 29 and 30, respectively, of the substrate layer 28 are prepared for the subsequent application of the polyurethane coating layers 34 and 39. This preparation includes, for example, the cleaning of the surfaces 40 and 41 preferably by degreasing and grit or sandblasting by use of conventional equipment for this purpose, and the application of a suitable metal primer coat to the cleaned surface. A 1-hour minimum drying time is preferred after application of the primer coat but a 1-month maximum time is possible if the primed surfaces are protected from contamination. A second coat of primer is optional but desirable in order to develop maximum adhesion. The metal primer coats can be applied with conventional air-type spray equipment or by hand if desired.

The flexible polyurethane coatings 34 and 39 are the reaction product of a polyurethane reaction mixture prepared by either the one-shot, prepolymer or quasiprepolymer methods or other well-known methods. The polyurethane reaction mixture thus formed is preferably first applied as layer 34 which substantially covers the adjacent surfaces 40 and 41 of the panel member 29 and 30 in the areas 35 and 36 immediately adjacent to the crack 33. The layer 34 may be applied by a brush or by the use of suitable spray equipment. Preferably, the layer 34 is allowed to dry for about 3 to about 4 hours after the last coat is applied or until it is substantially tack free.

The crack 30 is covered by fillers 37 and 38 in the form of elongated strips of material, such as a natural or synthetic foam rubber, or other suitable material as previously discussed, which are positioned adjacent to the crack 33 on either side thereof. Layer 39 in the form of a polyurethane reaction mixture prepared by one of the methods mentioned above is applied to cover each filler 37 and 38 and the adjacent surfaces 40 and 41 of the members 29 and 30 of the 28.

When coating the vertical surfaces of member 30 with the coating 39, it may be desired to incorporate a thickening agent into the polyurethane reaction mixture, such as pyrogenic silica in submicroscopic form. The coating 39 on the horizontal surfaces of member 29 are allowed to dry from about one-half to about 3 hours and preferably from about 1½ to about 2 hours minimum, and about 8 hours maximum before applying additional coats. It is normally recommended that coatings of the polyurethane reaction mixtures be applied only if the atmospheric temperature is 50° F. or above.

Although the thickness of the polyurethane coating layers of this invention may vary depending upon the specific application, they are normally applied to a thickness of from about 0.010 of an inch to about 0.050 of an inch and, preferably, from about 0.025 of an inch to about 0.040 of an inch.

The polyurethane composition used in this invention is prepared from

A. at least one reactive hydrogen-containing polymeric material selected from the group consisting of (1) polyhydroxyl polymers having a molecular weight of from about 750 to about 3,500 selected from polyether polyols, castor oil, hydroxyl-terminated linear polymeric polyesters derived from a glycol and an organic dicarboxylic acid, and (2) hydroxyl-terminated polymeric polyols having an average molecular weight of from about 1,000 to about 3,500 and an hydroxyl functionality of from about 2 to about 3, B. at least one organic polyisocyanate, the overall molar ratio of the isocyanato groups of the polyisocyanate to the reactive hydrogens of the hydrogen-containing polymeric material being between about 1.1/1 and about 12/1, and C. a curing agent selected from the group consisting of diamines having primary amino groups, diamines having secondary amino groups, hydrocarbon diols, and hydroxyl amines having primary amino groups, the overall ratio of the amino and hydroxyl groups of the curing agent to the isocyanate groups in excess of the reactive hydrogen groups of the reactive hydrogen-containing polymeric material being from about 0.5/1 to about 1.5/1.

Bifunctional materials, such as glycols and diamines are generally preferred as the curing agents. Representative classes of compounds suitable for use as such agents are glycols, diamines having primary or secondary amino groups, dicarboxylic acids, hydroxy amines, hydroxy-carboxylic acids, and amino-carboxylic acids. Representative examples of suitable compounds belonging to these classes are glycols, such as ethylene glycol, 1,3-propane diol, 1,4-butane-diol and glycerol; aliphatic diamines, such as ethylene diamine, trimethylene diamine, and tetramethylene diamine; aromatic diamines, such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine, p-amino-benzyl aniline, and o- and p-aminodiphenyl-amine; hydroxy amines, such as triethanol amine, 2-amino-ethyl alcohol, 2-amino-1-naphthol and m-aminophenyl; hydroxy carboxylic acids, such as glycolic acid and alpha-hydroxy propionic acid; and amino carboxylic acids, such as amino acetic acid and amino benzoic acid. The preferred curing agents are butane diol and the chloroamines, such as orthodichlorobenzidine and methylene bis orthochloroaniline.

Polyether polyols useful in preparing the polyurethane of this invention can be prepared by polymerizing or copolymerizing alkylene oxides, such as ethylene oxide, propylene oxide, and butylene oxides, by polymerizing or copolymerizing the low molecular weight glycols, or by the reaction of one or more such alkylene oxides with the glycols or with triol, or with a polycarboxylic acid, such as phthalic acid. The polyether polyols include polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Representative examples of hydroxyl-terminated linear polymeric polyesters are the condensation products of low molecular weight polyols with an organic polycarboxylic acid or anhydride. Representative low molecular weight polyols are glycols, such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about 1 to 20 percent by weight of a triol or higher polyfunctional polyol or polyfunctional acid can be present to produce branching in the polyurethane polymer.

It is usually preferred that the hydroxyl-terminated polymeric polyol has a molecular weight of from about 2,000 to about 4,000 and a corresponding hydroxyl number of from about 50 to about 25. The hydroxyl-terminated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to about 30 percent styrene with the aid of organic peroxy catalysts to provide polymers which are generally terminated at both ends of their chain with hydroxyl groups and have an hydroxyl functionality of from about 2 to about 3 and usually from about 2.1 to about 2.8. The preferred hydroxyl-containing polymeric polyols are polybutadiene polyols, polyisoprene polyols, and butadiene-styrene copolymer polyols having about 80 to 90 percent units derived from butadiene and about 20 to 10 percent units derived from styrene.

The organic polyisocyanates used in this invention include various organic diisocyanates and mixtures thereof. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methyl-one-bis(cyclohexyl-isocyanate) and 1,5-tetrahydronaphthalene diisocyanate, and mixtures of such diisocyanates. For the purposes of the present invention, the toluene-diisocyanates, diphenylmethane-4,4'-diisocyanate and 3,3'-dimethyl-4,4'-bisphenylene diisocyanate are preferred.

In the preparation of the polyurethane composition used in this invention, usually the ratio of isocyanato groups of the polyisocyanate, preferably an organic diisocyanate, to the reactive hydrogen-containing groups of the reactive hydrogen-containing polymeric material is from about 1.1/1 to about 12/1 and preferably about 1.2/1 to about 2.5/1. These materials can be reacted at temperatures from about 68° F. to about 300° F., and preferably from about 68° F. to about 212° F., to form the polyurethane composition. The reactive hydrogens are supplied by hydroxyl groups.

The compositions are normally dissolved or dispersed in a solvent to form a solution or dispersion. Various nonreactive solvents known to those skilled in the polyurethane art can be used for the preparation of the polyurethane coatings of this invention. Representative examples of the solvents are aromatic solvents, such as benzene, xylene and toluene; and the liquid lower ketones, such as acetone, methyl ethyl ketone, methyl isobutyl ketone, and diisobutyl ketone. If the polyurethane reaction mixtures are to be prepared in confined areas which are subject to explosive hazards, nonflammable chlorinated solvents can be used to form nonflammable prepolymer mixtures.

It is understood that various additives, fillers, plasticizers and pigments can be added to the polyurethane reaction mixture, such as, for example, carbon black, pyrogenic silica and coloring pigments.

The polyurethane compositions of this invention are useful when applied as flexible coatings to cover and protect substrates composed of structural members, such as steel, concrete, and the like, against rust, corrosion, and excessive wear. They are also useful in forming laminates for sealing openings or separations in various structures, such as concrete roofs and sidewalks and metal storage tanks. The flexible urethane coatings are also particularly useful for sealing separations in the bulkhead compartments of ships.

When the flexible coatings are used in the bulkhead compartments of ships they are exposed to fuels, such as crude oil, gasoline, and kerosene, and also to the corrosive action of salt water sprays of temperatures up to 180° F. which are employed to clean the bulkhead compartments after use. Consequently, the polyurethane composition of these coatings must be resistant to both fuels and water hydrolysis if reasonable service life is to be realized.

It has been determined that the necessary resistance is achieved by forming a reaction mixture of a polyester of the type hereinafter described with 4,4'-dicyclohexyl methane diisocyanate and specific organic diamines, such as 4,4'-dianilino-methane where the amine level is in the range of 0.75 to 1.0, and preferably 0.8 to 0.90 and forming the reaction mixture into a reaction product. This reaction product can be prepared by the prepolymer or the other well-known methods for making elastomers.

The polyesters useful in this invention are polytetramethylene adipates, polytetramethylene azelates, polyhexamethylene adipates and polyhexamethylene azelates having a molecular weight of 800 to 2,200 and preferably a mixture of these polyesters having a low molecular weight and one of a high molecular weight, for instance, a blend of 10 to 50 percent 2,000 and 90 to 50 percent 1,000 molecular weight. A mol of this polyester is reacted with 1.6 to 3.5 and preferably 2.0 to 3.0 of 4,4'-dicyclohexyl methane diisocyanate to form a prepolymer having about 2.8 to 10 and preferably 3.5 to 9.0 percent of free isocyanate. The prepolymer formation is accelerated and aided by heating the reactants preferably at a temperature of 160° to 230° F. for about 1 to 3 hours.

The prepolymer formed is preferably dissolved in suitable solvents, such as the liquid ketones and liquid aromatic hydrocarbons although other polyurethane solvents may be utilized. Then this prepolymer is reacted with preferably a ketone solution of 4,4'-dianilino-methane to form the polyesterurethane. Preferably, the solvent solution of the prepolymer and the diamine are intimately mixed essentially at the time the resulting mixture is applied to the adjacent surfaces of the substrate layer and over the fillers to form the polyurethane coating layers when the reaction is completed.

The following examples further illustrate the objects and advantages of this invention.

EXAMPLE I

Adjacent bulkhead compartments of an oil tanker similar to that shown in FIGS. 5 and 6 included a substrate composed of horizontal and vertical panel members which contained separations in the form of breaks or cracks at the weld junctures thereof. All the separations were drilled out at both ends and closed by welding. It was then necessary to form the laminate of this invention in order to provide an adequate seal for the separations in the event of a future reopening.

The adjacent surfaces of the substrate layer were previously degreased by a hot water spray and sandblasted to present a clean gray white surface for the application of a metal primer. By use of an airless-type spray equipment one coat of a polyurethane metal primer of the type known as Chemlock No. 218, manufactured by Hughson Chemical Company, was applied to the cleaned surfaces, within about 2 hours after sandblasting in order to protect the prepared surface from rust formation. In many applications a second coat of metal primer is desirable in order to develop maximum adhesion in which case the first coat of metal primer is allowed to dry for about 1 hour before the second coat is applied.

The polyurethane composition of the flexible coating layer was prepared in a suitable facility for that purpose as follows:

A prepolymer was prepared from 1 mol of polytetramethylene adipate of 1,000 molecular weight, 1 mol of polytetramethylene adipate of 2,000 molecular weight and 4 mols 4,4'-dicyclohexyl methane diisocyanate, It was diluted with toluene to 50 percent solids. Analysis showed an isocyanate content of 2.2 percent NCO.

The diluted prepolymer and a mixture containing the curing agent was shipped to the job site where the oil tanker was in dry dock. At the job site a ratio of about 3.0 parts by volume of the polyurethane diluted prepolymer to about 1.0 parts by volume of a mixture of 4,4'-methylene-dianiline, carbon black cellosolve masterbach, plasticizer of the type known as Modaflow, manufactured by Monsanto Chemical Company, and methylethyl ketone, was mixed by the use of an air mixer to form the polyurethane reaction mixture. It is preferred when large tanks or bulkhead compartments are being coated that the mixing operation be carried out in 5-gallon batches with each batch being mixed for about 3 minutes.

If vertical surfaces are to be sprayed a submicroscopic silica thickening agent may be incorporated into the above mixture at a ratio of about 0.75 parts by volume of thickening agent to about 1.0 volume of prepolymer and mixed with an air stirrer for about 3 minutes.

The flexible coating composed of the polyurethane reaction mixture was applied to the areas immediately adjacent to the closed crack. The coating was applied to an average thickness of about 0.015 to about 0.20 of an inch in increments of about 0.002 of an inch with about one-fourth to about one-half of an hour drying time allowed between the application of increments of the coating. The last coat was allowed to dry for about 3 hours.

The separation was covered by fillers of polyesterurethane foam rubber tape approximately 2.0 inches wide and 0.25 of an inch thick, which were positioned adjacent to the closed crack on either side thereof. The fillers included a pressure sensitive adhesive layer on one side which was positioned against the coating layer of polyurethane so as to adhere thereto immediately adjacent to the crack. The foam rubber tape was covered and held in place by strips of masking tape having a width of about 3.0 inches. If fillers of flowable caulking compound are used for this purpose, the necessity of the strips of masking tape are eliminated. Consequently, a filler of caulking compound may be more satisfactory for this purpose.

The fillers were overcoated with a flexible coating layer of the polyurethane reaction mixture to an average thickness of about 0.015 to about 0.020 of an inch and the adjacent surfaces of the substrate were also covered to about the same thickness. Airless spray equipment was used to apply the flexible coatings. The flexible coating layers were applied at an atmospheric temperature well above 50° F. and allowed to cure for about 72 hours at room temperature before the bulkhead composition containing the finished laminate was placed in service.

A visual inspection of the bulkhead compartments after several months in service carrying various fuels indicated that the sealing laminate of this invention performed quite satisfactorily with no appreciable amount of leakage being detected.

The water hydrolysis and fuel resistance of the polyurethane composition are illustrated in Examples II and III.

EXAMPLE II

A polyurethane prepolymer of essentially the same formulation of the prepolymer of Example I was extended with 4,4'-methylene-dianiline (MDA) dissolved in methylethyl ketone. Films were drawn on polyethylene slabs and allowed to cure at room temperature.

The amine level and physical results on these cured films are shown in table A, on a parts by weight basis:

Table A

| Recipe No. | 1 | 2 | 3 |
|---|---|---|---|
| Diluted prepolymer | 50 | 50 | 50 |
| 4,4'-Methylenedianiline | 2.1 | 2.3 | 2.6 |
| Methylethyl ketone | 6 | 6 | 6 |
| Amine level | 0.8 | 0.9 | 1.0 |
| Tensile (p.s.i.) | 2,800 | 4,300 | 5,900 |
| Elongation (%) | 460 | 370 | 400 |
| 100% Modulus (p.s.i.) | 800 | 1,000 | 1,300 |
| *After 3 days in water at 158° F.* | *(Measured Wet)* | | |
| Tensile (p.s.i.) | 6,000 | 6,500 | 6,400 |
| Elongation (%) | 540 | 430 | 440 |
| 100% Modulus (p.s.i.) | 800 | 800 | 900 |
| Thickness (inch) | 0.015 | 0.015 | 0.019 |
| *After 14 days in water at 158° F.* | *(Measured wet)* | | |
| Tensile (p.s.i.) | 5,100 | 5,600 | 5,800 |
| Elongation (%) | 420 | 420 | 420 |
| 100% Modulus (p.s.i.) | 900 | 900 | 1,000 |
| Tensile Retention Tensile Retention | 214 | 130 | 98 |
| Volume Change (%)* | 19 | 21 | 20 |
| *After Steam Autoclave 5 hrs./240° F.* | | | |
| Tensile (p.s.i.) | 6,000 | 5,500 | 5,200 |
| Elongation (%) | 460 | 470 | 380 |
| 100% Modulus (p.s.i.) | 1,000 | 1,000 | 1,200 |

*After standing 4 days at 77° F. in a mixture of 70% isooctane and 30% toluene. Note all volume changes were run in this manner.

EXAMPLE III

A nylon fabric of 12 ounces per square yard was spray coated on both sides with a polyurethane solution essentially the same as that of example I at an amine level of 0.9 and air dried for 2 days. This polyurethane coated fabric was submitted to a diesel fuel drip test in the presence of heat (125° F.) light, air, moisture and ultraviolet. The diesel fuel was U.S. Army certified FS-2 grade.

The results of the test are shown in table B.

Table B

| Test Time | Comment |
|---|---|
| 22 days | Rubber was strong. Satisfactory on crack test. Satisfactory on thumb test. A solid residue insoluble in isooctane deposited on the rubber. |
| 30 days | Diesel fuel showed pH 3.9. (Initial pH 6.5). |
| 35 days | Diesel fuel showed pH 3.9. Satisfactory on strength, on bend test and on thumbnail test. |
| 73 days | Diesel fuel showed pH 3.9. Rubber washed with soap and water. Satisfactory on strength, no cracks and passed the thumbnail test. |

While certain representative embodiments and details have been shown for the purpose of illustrating the invention, it will be apparent to those skilled in the art that various changes and modifications may be made therein without departing from the spirit or scope of the invention.

What is claimed is:

1. A laminate resistant to hydrolysis and fuel oil deterioration including at least two layers, to provide for the sealing of separations in one of said layers thereof, comprising:
   A. a substrate layer composed of a material selected from the group consisting of steel or concrete which includes at least one member having at least two adjacent separated surfaces; and
   B. at least one flexible coating layer composed of a nonfoaming polyurethane composition reacted in situ substantially covering the adjacent surfaces of said substrate layer and the separation therebetween and adhered thereto except in areas thereof immediately adjacent to and directly over each separation therein by an interposed nonadhesive material in that area, thus forming at least one nonadhering portion of said coating layer, said laminate being of sufficient strength and flexibility so that when said substrate layer moves due to thermal or mechanical forces substantially all of any stress associated with such movement is distributed over each nonadhering portion of said coating layer to prevent a concentration of stresses which would rupture said coating layer, said polyurethane composition prepared from:
   1. at least one reactive hydrogen-containing polymeric material selected from the group consisting of:
      (a) polyhydroxyl polymers having a molecular weight of from about 750 to about 3,500 selected from polyether polyols, castor oil, hydroxyl terminated linear polymeric polyesters derived from a glycol and an organic dicarboxylic acid, and
      (b) hydroxyl-terminated polymeric polyols having an average molecular weight of from about 1,000 to about 3,500 and a hydroxyl functionality of from about 2 to about 3;
   2. at least one organic polyisocyanate, the overall molar ratio of the isocyanato groups of the polyisocyanate to the reactive hydrogens of the hydrogen-containing polymeric material being between about 1.1/1 and about 12/1; and
   3. a curing agent selected from the group consisting of diamines having primary amino groups, diamines having secondary amino groups, hydrocarbon diols, and hydroxyl amines having primary amino groups, the overall ratio of the amino and hydroxyl groups of the curing agent to the isocyanato groups in excess of the reactive hydrogen groups of the reactive hydrogen-containing polymeric material being from about 0.5/1 to about 1.5/1.

2. The laminate as claimed in claim 1, wherein the polyurethane composition is characterized by being resistant to water hydrolysis when immersed in distilled water for 14 days at 158° F.

3. The laminate as claimed in claim 1, wherein the polyurethane composition is a polyesterurethane having about 3,000 pounds tensile strength, or higher, after exposure in water for 14 days at 158° F., comprising the reaction product of a mol of a polyester selected from the group consisting of polyhexamethylene adipate, polyhexamethylene azelate, polytetramethylene azelate and polytetramethylene adipate having a molecular weight of 800 to 2,200, from about 1.6 to 3.5 mols of 4,4′-dicyclohexyl methane diisocyanate and 0.75 to 1.0 mols of an aromatic diamine.

4. The laminate as claimed in claim 1, wherein at least one additional flexible coating layer composed of a polyurethane composition is superposed over said substrate layer in the areas thereof immediately adjacent to each separation therein which is not adhered to said coating layer and at least one said filler is superposed over at least a portion of each said additional coating layer.

5. The laminate as claimed in claim 1, wherein said substrate layer includes two members which are inclined in relation to each other with a separation formed at the juncture thereof which is covered by fillers of flexible material positioned adjacent the separation on either side thereof.

6. The laminate as claimed in claim 1, wherein each said filler is an elongated strip of material having a tensile strength lower than that of said coating layer thereof and selected from the group consisting of natural and synthetic foam rubbers, caulking compounds and textile fabrics.